United States Patent
Trelewicz et al.

(10) Patent No.: US 6,766,341 B1
(45) Date of Patent: Jul. 20, 2004

(54) FASTER TRANSFORMS USING SCALED TERMS

(75) Inventors: Jennifer Quirin Trelewicz, Superior, CO (US); Joan LaVerne Mitchell, Longmont, CO (US); Michael Thomas Brady, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/694,448

(22) Filed: Oct. 23, 2000

(51) Int. Cl.$^7$ .............................................. G06F 17/14
(52) U.S. Cl. ...................... 708/400; 708/402
(58) Field of Search .......................... 708/400, 401, 708/402, 403, 404, 405, 406

(56) References Cited

U.S. PATENT DOCUMENTS

| | | | |
|---|---|---|---|
| 4,837,724 A | 6/1989 | Borgers et al. | |
| 4,860,097 A | 8/1989 | Hartnack et al. | |
| 5,301,242 A | 4/1994 | Gonzales et al. | |
| 5,379,122 A | 1/1995 | Eschbach | |
| 5,528,533 A | 6/1996 | Kitaura et al. | |
| 5,533,052 A | 7/1996 | Bhaskar | |
| 5,539,836 A | 7/1996 | Babkin | |
| 5,642,438 A | 6/1997 | Babkin | |
| 5,649,077 A | 7/1997 | On et al. | |
| H1684 H | 10/1997 | De Queiroz et al. | |
| 5,701,263 A | * 12/1997 | Pineda | 708/402 |
| 5,781,239 A | * 7/1998 | Mattela et al. | 348/415 |
| 5,790,775 A | 8/1998 | Marks et al. | |
| 5,805,482 A | 9/1998 | Phillips | |
| 5,822,003 A | 10/1998 | Girod et al. | |
| 5,822,484 A | 10/1998 | Arroyo | |
| 5,854,757 A | * 12/1998 | Dierke | 708/402 |
| 5,867,601 A | 2/1999 | Phillips | |
| 6,002,809 A | 12/1999 | Feig et al. | |
| 6,009,207 A | 12/1999 | Chen | |
| 6,044,176 A | 3/2000 | Kim et al. | |
| 6,067,384 A | 5/2000 | Manickam et al. | |
| 6,073,218 A | 6/2000 | DeKoning et al. | |
| 6,092,920 A | 7/2000 | Sakamoto | |
| 6,097,846 A | 8/2000 | Abe | |
| 6,112,219 A | 8/2000 | Girod et al. | |
| 6,115,772 A | 9/2000 | Crater | |

FOREIGN PATENT DOCUMENTS

JP  11-215499  8/1999

* cited by examiner

*Primary Examiner*—Chuong Dinh Ngo
(74) *Attorney, Agent, or Firm*—Crawford Maunu PLLC

(57) ABSTRACT

Fast transforms that use multiple scaled terms is disclosed. The discrete transforms are split into sub-transforms that are independently calculated using multiple scaling terms on the transform constants. The effect of the scaling for the transform coefficients may optionally be handled by appropriately scaling the quantization values or any comparison values. Further, optimal representations of the scaled terms for binary arithmetic are found. The resulting calculations result in fast transform calculations, decreased software execution times and reduced hardware requirements for many linear transforms used in signal and image processing application, e.g., the DCT, DFT and DWT.

66 Claims, 6 Drawing Sheets

FASTER TRANSFORMS USING SCALED TERMS

CROSS-REFERENCE TO RELATED APPLICATION

This application is related to the following co-pending and commonly assigned patent applications, which are hereby incorporated herein by reference in their respective entirety:

"FASTER DISCRETE COSINE TRANSFORM USING SCALED TERMS" to Brady et al., application Ser. No. 09/694,452, filed on Oct. 23, 2000; and "FASTER TRANSFORMS USING EARLY ABORTS AND PRECISION REFINEMENTS" to Mitchell et al., application Ser. No. 09/694,455, filed on Oct. 23, 2000.

BACKGROUND OF THE INVENTION

1. Field of the Invention

This invention relates in general to data processing, and more particularly to faster transforms that use multiple scaled terms.

2. Description of Related Art

Transforms, which take data from one domain (e.g., sampled data) to another (e.g., frequency space), are used in many signal and/or image processing applications. Such transforms are used for a variety of applications, including, but not limited to data analysis, feature identification and/or extraction, signal correlation, data compression, or data embedding. Many of these transforms require efficient implementation for real-time and/or fast execution whether or not compression is used as part of the data processing.

Data compression is desirable in many data handling processes, where too much data is present for practical applications using the data. Commonly, compression is used in communication links, to reduce transmission time or required bandwidth. Similarly, compression is preferred in image storage systems, including digital printers and copiers, where "pages" of a document to be printed may be stored temporarily in memory. Here the amount of media space on which the image data is stored can be substantially reduced with compression. Generally speaking, scanned images, i.e., electronic representations of hard copy documents, are often large, and thus make desirable candidates for compression.

In data processing, data is typically represented as a sampled discrete function. The discrete representation is either made deterministically or statistically. In a deterministic representation, the point properties of the data are considered, whereas, in a statistical representation, the average properties of the data are specified. In particular examples referred to herein, the terms images and image processing will be used. However, those skilled in the art will recognize that the present invention is not meant to be limited to processing images but is applicable to processing different data, such as audio data, scientific data, image data, etc.

In a digital image processing system, digital image signals are formed by first dividing a two-dimensional image into a grid. Each picture element, or pixel, in the grid has associated therewith a number of visual characteristics, such as brightness and color. These characteristics are converted into numeric form. The digital image signal is then formed by assembling the numbers associated with each pixel in the image into a sequence which can be interpreted by a receiver of the digital image signal.

Signal and image processing frequently require converting the input data into transform coefficients for the purposes of analysis. Often only a quantized version of the coefficients is needed (e.g. JPEG/MPEG data compression or audio/voice compression). Many such applications need to be done fast in real time such as the generation of JPEG data for high speed printers.

Pressure is on the data signal processing industry to find the fastest method by which to most effectively and quickly perform the digital signal processing. As in the field of compression generally, research is highly active and competitive in the field of fast transform implementation. Researchers have made a wide variety of attempts to exploit the strengths of the hardware intended to implement the transforms by exploiting properties found in the transform and inverse transform.

One such technique is the ISO 10918-1 JPEG International Standard /ITU-T Recommendation T.81. The draft JPEG standard is reproduced in Pennebaker and Mitchell, JPEG: Still Image Data Compression Standard, New York, Van Nostrand Reinhold, 1993, incorporated herein by reference. One compression method defined in the JPEG standard, as well as other emerging compression standards, is discrete cosine transform (DCT) coding. Images compressed using DCT coding are decompressed using an inverse transform known as the inverse DCT (IDCT). An excellent general reference on DCTs is Rao and Yip, Discrete Cosine Transform, New York, Academic Press, 1990, incorporated herein by reference. It will be assumed that those of ordinary skill in this art are familiar with the contents of the above-referenced books.

It is readily apparent that if still images present storage problems for computer users and others, motion picture storage problems are far more severe, because full-motion video may require up to 60 images for each second of displayed motion pictures. Therefore, motion picture compression techniques have been the subject of yet further development and standardization activity. Two important standards are ISO 11172 MPEG International Standard and ITU-T Recommendation H.261. Both of these standards rely in part on DCT coding and IDCT decoding.

However, research generally focuses on specific techniques, such as the above-mentioned techniques that used DCT coding to provide the desired degree of compression. Nevertheless, other transforms may be used to provide certain advantages under certain circumstances. For example, in the DCT compression coding method discussed above, an input image is divided into many uniform blocks and the two-dimensional discrete cosine transform function is applied to each block to transform the data samples into a set of transform coefficients to remove the spatial redundancy. However, even though a high compression rate may be attained, a blocking effect, which may be subtle or obvious, is generated. Further, vector quantization methods that may be utilized by the compression system are advantageous due to their contribution to the high compression rate. On the other hand, a sub-band method may reduce the blocking effect which occurs during high rates of data compression. The wavelet transform (WT) or Sub-Band Coding (SBC) methods encode signals based on, for example, time and frequency components. As such, these transform methods can be useful for analyzing non-stationary signals and have the advantage that they may be designed to take into account the characteristics of the human visual system (HVS) for image analysis.

It can be seen then that there is a need to provide a method and apparatus that provides faster transform calculations, decreased software execution times and reduced hardware requirements.

SUMMARY OF THE INVENTION

To overcome the limitations in the prior art described above, and to overcome other limitations that will become apparent upon reading and understanding the present specification, the present invention discloses fast transforms that use multiple scaled terms.

The present invention solves the above-described problems by splitting discrete transforms into sub-transforms that are independently calculated using scaled terms on the transform constants. Further, optimal representations of the scaled terms for binary arithmetic are found. The resulting calculations result in fast transform calculations, decreased software execution times and reduced hardware requirements. Moreover, those skilled in the art will recognize that the inverse transform can often be implemented using the same method so that, in general, the same number of operations is used.

A method in accordance with the principles of the present invention includes arranging transform equations into at least one collection having at least two transform constants and independently scaling the at least two transform constants for each collection with a scaling term to maintain a substantially uniform ratio between the at least two transform constants within the at least one collection.

Other embodiments of a method in accordance with the principles of the invention may include alternative or optional additional aspects. One such aspect of the present invention is that the method further includes separating data into at least one block and transforming the block into transform data via the scaled transform equations.

Another aspect of the present invention is that the scaling term is chosen according to a predetermined cost function.

Another aspect of the present invention is that the predetermined cost function comprises selecting the scaling term so that the largest error on any transform coefficient is no larger than a predetermined error percentage.

Another aspect of the present invention is that the predetermined cost function comprises selecting the scaling term so that the largest error on each involved transform coefficient is no larger than its individual predetermined error percentage.

Another aspect of the present invention is that the predetermined cost function comprises selecting the scaling term so that predetermined transform constants have an error less than or equal to a predetermined error percentage.

Another aspect of the present invention is that the predetermined cost function comprises selecting the scaling term so that each involved predetermined transform constant has an error less than or equal to its individual predetermined error percentage.

Another aspect of the present invention is that the predetermined cost function comprises selecting the scaling term and representations for the transform constants so that all transform constants for a collection possess simultaneous binary representations with predetermined characteristics.

Another aspect of the present invention is that the predetermined characteristics comprise a minimum number of common power-of-2 terms.

Another aspect of the present invention is that the selecting of the scaling term and representations for the transform constants so that all transform constants for a collection possess simultaneous binary representations with a minimum number of common power-of-2 terms is implemented when binary arithmetic shifts may be more efficient than multiplication operations.

Another aspect of the present invention is that the predetermined characteristics comprise a maximized clustering of non-zero power-of-2 terms.

Another aspect of the present invention is that the selecting of the scaling term so that all transform constants for a collection possess simultaneous binary representations with a maximized clustering of non-zero power-of-2 terms is implemented when multiplication operations employing smaller integers are more desirable than multiplies employing larger numbers.

Another aspect of the present invention is that whether the coefficient in a power-of-2 polynomial representing the constant is non-zero is tracked.

Another aspect of the present invention is that a value of the bit position determines the power-of-2 term.

Another aspect of the present invention is that maximizing the clustering of non-zero power-of-2 terms includes finding all representations of the scaled constants by a) setting a first variable to an ith element in the block, b) initializing a second variable to a value of 2, c) initializing a bitmask to binary 3, d) analyzing the bits to determine whether the ith element indicated by the first variable is a candidate representation for doing the term reordering using $2^n+2^{n-1}=2^{n+1}-2^{n-1}$, e) encoding the ith element by adding the second variable to the first variable to perform an effective power-of-2 change given by $2^n+2^{n-1}=2^{n+1}-2^{n-1}$, f) obtaining a new representation and incrementing the first variable to the i+1th element, g) shifting the mask and second variable left one bit and h) repeating d–g.

Another aspect of the present invention is that the method further includes shifting the mask left after checking if the first variable matching the mask bits were set thereby putting a zero at the right and increasing the power of 2 that is used for reordering in $2^n+2^{n-1}=2^{n+1}-2^{n-1}$.

Another aspect of the present invention is that the collections represent disjoint sets of transform equations of partial calculations.

Another aspect of the present invention is that the collections do not represent disjoint sets of transform equations of partial calculations.

Another aspect of the present invention is that the method further includes selecting an independent scaling term for the transform constants in each of the at least one collections.

In another embodiment of the present invention, a data compression system is provided. The data compression system includes a transformer for applying a linear transform to decorrelate data into transform coefficients using transform equations, the transform equations being formed by arranging transform equations into at least one collection having at least two transform constants and independently scaling the at least two transform constants for each collection with a scaling term to maintain a substantially uniform ratio between the at least two transform constants within the at least one collection, wherein the scaling term is chosen according to a predetermined cost function and a quantizer for quantizing the transformed data into quantized data by reducing a number of bits needed to represent the transform coefficients.

In another embodiment of the present invention, a printer is provided. The printer includes memory for storing image data, a processor for processing the image data to provide a compressed print stream output and a printhead driving circuit for controlling a printhead to generate a printout of the image data, wherein the processor applies a linear transform to decorrelate data into transform coefficients using transform equations, the transform equations being formed by arranging transform equations into at least one collection having at least two transform constants and independently scaling the at least two transform constants for each collection with a scaling term to maintain a substantially uniform ratio between the at least two transform constants within the at least one collection, wherein the scaling term is chosen according to a predetermined cost function In another embodiment of the present invention, an article of manufacture is provided. The article of manufacture includes a program storage medium readable by a computer, the medium tangibly embodying one or more programs of instructions executable by the computer to perform a method for arranging transform equations into at least one collection having at least two transform constants and independently scaling the at least two transform constants for each collection with a scaling term to maintain a substantially uniform ratio between the at least two transform constants within the at least one collection, wherein the scaling term is chosen according to a predetermined cost function.

In another embodiment of the present invention, a data analysis system is provided. The data analysis system includes transform equations being formed by arranging transform equations into at least one collection having at least two transform constants and independently scaling the at least two transform constants for each collection with a scaling term to maintain a substantially uniform ratio between the at least two transform constants within the at least one collection, wherein the scaling term is chosen according to a predetermined cost function and a transformer for applying the transform equations to perform a linear transform to decorrelate data into transform coefficients.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides fast transforms that use multiple scaled terms. The transforms are split into sub-transforms that are independently calculated using scaled terms for the transform constants. Optimal representations of the scaled terms for binary arithmetic are found. This method results in fast transform calculations, decreased software execution times and reduced hardware requirements. According to the present invention, discrete transforms used in signal and image processing employ what are called basis functions which set the structure of the transform and form the grounds for allowing the transform to be calculated in two or more sub-collections. Cost functions for fast implementations of the transforms are then used to find optimal representations of the basis coefficients in the calculation.

Figure 1:
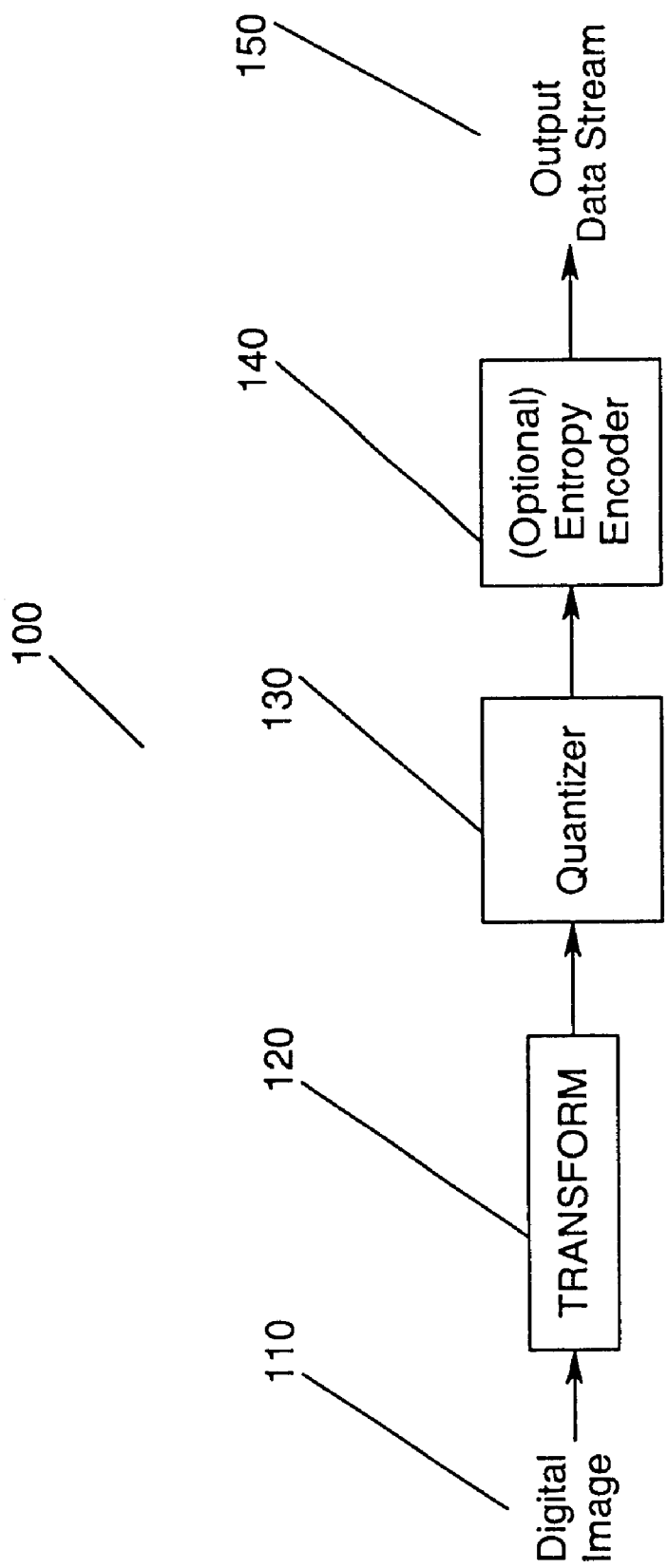
FIG. 1 illustrates a typical image compression system.

FIG. 1 illustrates a typical image compression system 100. The data compression system may include three closely connected components namely (a) Transform 120, (b) Quantizer 130, and (c) Optional Entropy Encoder 140. Compression is accomplished by applying a linear transform to decorrelate the image data 110, quantizing the resulting transform coefficients, and, if desired, entropy coding the quantized values. A variety of linear transforms have been developed which include Discrete Fourier Transform (DFT), Discrete Cosine Transform (DCT), Discrete Wavelet Transform (DWT) and many more, each with its own advantages and disadvantages.

The quantizer 130 simply reduces the number of bits needed to store the transformed coefficients by reducing the precision of those values. Since this is a many-to-one mapping, it is a lossy process and is a significant source of compression in an encoder. Quantization can be performed on each individual coefficient, which is known as Scalar Quantization (SQ). Quantization can also be performed on a collection of coefficients together, and this is known as Vector Quantization (VQ). Both uniform and non-uniform quantizers can be used depending on the problem at hand.

The optional entropy encoder 140 further compresses the quantized values losslessly to give better overall compression. It uses a model to accurately determine the probabilities for each quantized value and produces an appropriate code based on these probabilities so that the resultant output code stream will be smaller than the input stream. The most commonly used entropy encoders are the Huffman encoder and the arithmetic encoder, although for applications requiring fast execution, simple run-length encoding (RLE) has proven very effective.

The term image transforms usually refers to a class of unitary matrices used for representing images. This means that images can be converted to an alternate representation using these matrices. These transforms form the basis of transform coding. Transform coding is a process in which the coefficients from a transform are coded for transmission.

The signal $f(x)$ is a function mapping each integer from $0 \ldots n-1$ into a complex number. An example is given by a line of a sampled or pixelated image, where the samples or pixels are equally spaced. An "orthogonal basis" for a collection of such $f(x)$ is a set $\{b_y(x)\}_{y=0}^{n-1}$ of functions, where $$\sum_{x=0}^{n-1} b_y(x)b_z(x) = 0 \text{ for } y \neq z.$$

A "transform" of $f(x)$, denoted F(y), is given by $$F(y) = \sum_{x=0}^{n-1} f(x)b_y(x).$$

Transforms of this type are used in many signal and image processing applications to extract information from the original signal $f$. One example of a transform is the discrete Fourier transform (DFT), where $b_y(x)=\exp(2\pi ixy/n)$. A related example is the discrete cosine transform (DCT), where $b_y(x)=\cos(2\pi xy/n)$. Another example is the wavelet transform, where $b_y(x)$ is a particular scaled and offset version of the mother wavelet function. (See, Ingrid Daubechies, *Ten Lectures on Wavelets,* Society for Industrial & Applied Mathematics, (May 1992)).

The theoretical basis for the independent scaling operations will now be demonstrated by showing the mathematical basis for being able to perform the scales without destroying the structure of the transform. Define a transform $$F(y) = \sum_{x=0}^{n-1} f(x)b_y(x).$$

Consider those cases (described below) when the $b_y(x)$ are such that this transform can be split into two or more disjoint sums, regardless of the structure of $f(x)$. (The term "disjoint", when used herein in reference to the sets of equations, means that there are no transform coefficients in common between equations in the two disjoint sets of equations.) For example, if $b_{2y}(x)$ have even symmetry, and $b_{2y+1}(x)$ have odd symmetry, it is known from mathematics that any $f(x)$ can be written uniquely as $f(x)=f_e(x)+f_o(x)$, where $f_e(x)$ is even (symmetric about zero) and $f_o(x)$ is odd (anti-symmetric about zero), and that $$\sum_x f_e(x)b_{2y-1}(x) = \sum_x f_o b_{2y}(x) = 0.$$

This enables the transform to be written equivalently as:

$$F(y) = \sum_{y=0}^{\lfloor (n-1)/2 \rfloor} f_e(x)b_{2y}(x) + \sum_{y=1}^{\lfloor n/2 \rfloor} f_o(x)b_{2y-1}(x)$$

Figure 2:
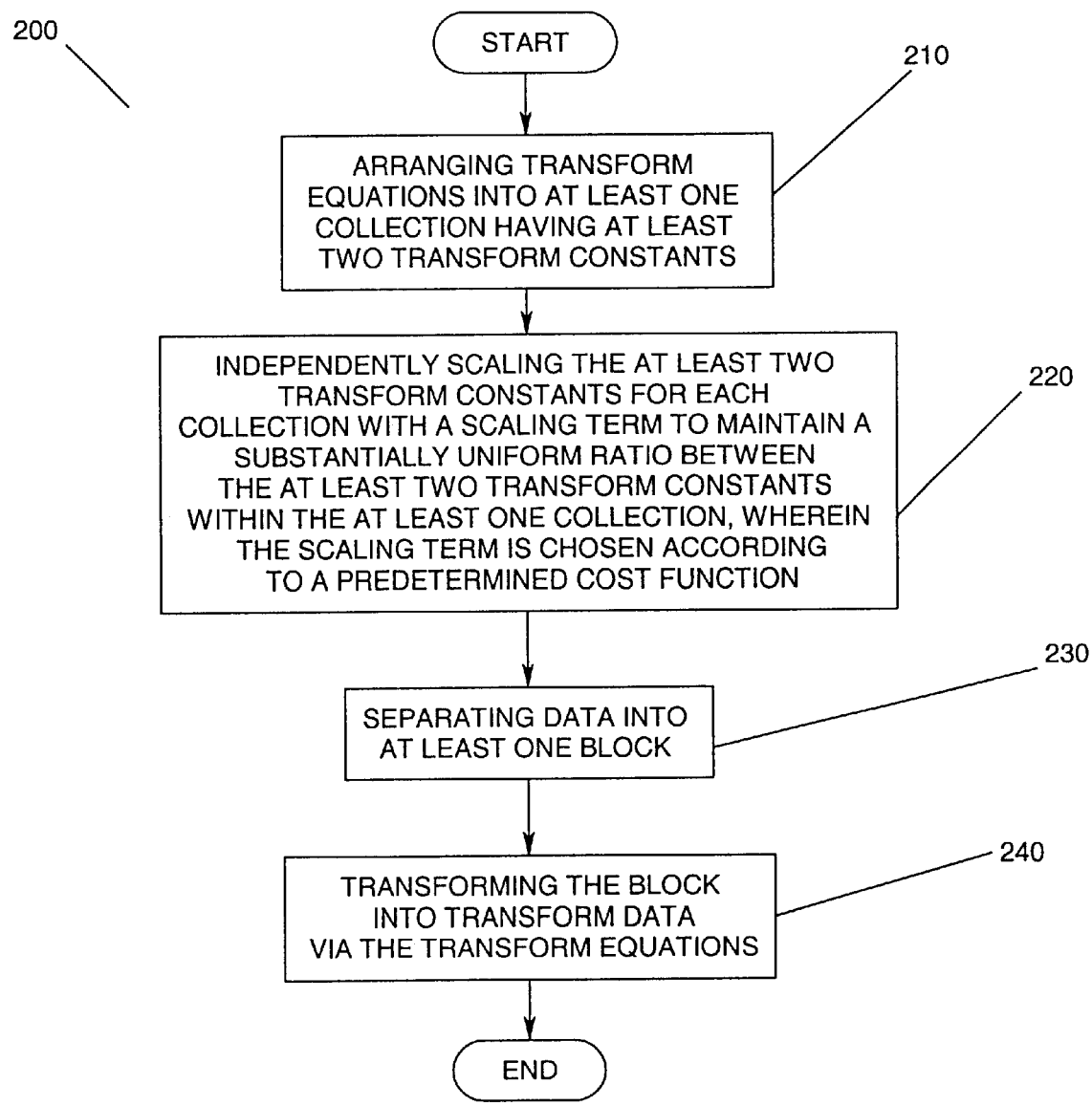
FIG. 2 illustrates a flow chart of the present invention.

FIG. 2 illustrates a flow chart 200 of the present invention. In FIG. 2, transform equations are split into at least one sub-transform having at least two transform constants 210. The term "sub-transforms", as used herein, references the collection of equations used to generate a subset of the transformed terms, where the subset may contain all of the transformed terms, or fewer that the total number of transformed terms. Next, the transform constants for each collection are independently scaled with a scaling term to maintain a substantially uniform ratio between the transform constants within the collection, wherein the scaling term is chosen according to a predetermined cost function 220. The result is the transform equations for transforming the block. The data is separated into at least one block 230. The block is then transformed into transformed data using the transform equations 240. Traditional systems would perform blocks 210 and 220 offline. However, for algorithms in which are specified at run time such as JPEG 2000, these blocks would be automatically done during the program initialization phase. Referring to the quantizer 130 of FIG. 1, the transformed data may then be quantized by incorporating the scaling into the quantization. This is in contrast to the Integer Cosine Transform (ICT) (see, for example, Pang et al., "A self-timed chip for image coding"), where each coefficient is scaled by the same value in every equation, a method which does not provide the same computational advantages as the method described herein.

Choosing the scaled term for the constants may be performed with the use of a cost function that represents the needs of the target system. Several parameters to this cost function were identified for fast transforms. The actual cost function that is used may include one or a combination of the following cost functions:

The first cost function is where the largest error on any transform coefficient (i.e., F(x)) is no larger than P%, where P is selected by the algorithm designer. In the example below, P=1.

The second cost function is where some more important transform constants, as selected by the algorithm designer, have no more than $P_{important}$% error. In the example below, the low frequency terms are less than 0.1% in error.

The third cost function is split into two criteria, C1 and C2, which have applications to different systems; i.e., one generally chooses to satisfy either criterion C1 or criterion C2. Criterion C1 is applicable to implementations (e.g., software or firmware) where shifts may be more efficient than multiplies. Criterion C2 is applicable to implementations where multiplies employing smaller integers are more desirable than multiplies employing larger numbers (e.g., software implementations where multiplies above a certain number of bits use more cycles, or where total precision is a concern.) Specific examples are given to illustrate these two criteria. Both criteria could be used together.

According to the first criterion, C1, all scaled integer basis multipliers (in the case of the FDCT, the constants $C_1$ through $C_7$, where $C_k=\cos(k\pi/16)$) appearing in the same sum should possess simultaneous binary representations with the minimum number of common power-of-2 terms, i.e., the set of power-of-2 terms over all of the representations within a collection is as small as possible. The real-number constants may be approximated by rational numbers; i.e., ratios of integers. The word "representation", as used herein in reference to the scaled constants of the transform, refers to the way in which the numerator of this ratio of integers may be calculated as sums and/or differences of powers-of-two.

For example, in the FDCT, the transform can be broken into three sets of equations as shown:

$$2S(0)=C_4(s_{0734}+s_{1625})$$
$$2S(4)=C_4(s_{0734}-s_{1625}) \qquad (1)$$

$$2S(2)=C_2 d_{0734}+C_6 d_{1625}$$
$$2S(6)=C_6 d_{0734}-C_2 d_{1625} \qquad (2)$$

$$2S(1)=C_1 d_{07}+C_3 d_{16}+C_5 d_{25}+C_7 d_{34}$$
$$2S(3)=C_3 d_{07}-C_7 d_{16}-C_1 d_{25}-C_5 d_{34}$$
$$2S(5)=C_5 d_{07}-C_1 d_{16}+C_7 d_{25}+C_3 d_{34}$$
$$2S(7)=C_7 d_{07}-C_5 d_{16}+C_3 d_{25}-C_1 d_{34} \qquad (3)$$

The notation used for these equations is taken from the Pennebaker book. Note that the Ss are proportional to the $\hat{F}$s.

Thus, the constants in set 3 should have simultaneous binary representations with the minimum number of common power-of-2 terms, but their simultaneous representations are not relevant to those used for the constants in set 2. A specific example for set 3 is given by the following:

$$41C_1 \approx 40 = 2^5 + 2^3$$

$$41C_3 \approx 34 = 2^5 + 2^1$$

$$41C_5 \approx 23 = 2^5 - 2^3 - 2^1 + 2^0$$

$$41C_7 \approx 2^3$$

All of these representations have less than 1% error per coefficient. In this example, the set of common power-of-2 terms is $\{2^5, 2^3, 2^1, 2^0\}$, as can be seen from the equations. These representations may be viewed as polynomials in 2 with ±1 or 0 multiplying each power of 2; i.e., $$41C_1 \approx 1 \cdot 2^5 + 1 \cdot 2^3 + 0 \cdot 2^1 + 0 \cdot 2^0 \quad (4)$$

What makes minimizing the number of these terms efficient is the following: the set 3 equations can be calculated by grouping these powers of 2. In the architecture that this criterion C1 is used for, adds and shifts are cheaper in cycles than multiplies, so we can look at the set 3 equations as calculating the matrix operation $$\begin{bmatrix} 2^5+2^3 & 2^5+2^1 & 2^5-2^3-2^1+2^0 & 2^3 \\ 2^5+2^1 & -2^3 & -(2^5+2^3) & -(2^5-2^3-2^1+2^0) \\ 2^5-2^3-2^1+2^0 & -(2^5+2^3) & 2^3 & 2^5+2^1 \\ 2^3 & -(2^5-2^3-2^1+2^0) & 2^5+2^1 & -(2^5+2^3) \end{bmatrix} \begin{bmatrix} d_{07} \\ d_{16} \\ d_{25} \\ d_{34} \end{bmatrix}$$

which takes a total of 28 operations, counting adds and shifts. If we precalculate $A = d_{25} - d_{34}$ and $B = d_{07} + d_{16}$, the equation becomes $$\begin{bmatrix} -d_{25} & d_{16} & d_{07}-A & d_{25}+B \\ d_{34} & d_{07} & -d_{16}-A & d_{07}-d_{25}-d_{34} \\ -d_{07} & d_{34} & d_{25}-B & d_{34}+d_{07}-d_{16} \\ d_{16} & d_{25} & -d_{34}+B & -d_{16}+A \end{bmatrix} \begin{bmatrix} 2^0 \\ 2^1 \\ 2^3 \\ 2^5 \end{bmatrix}$$

which, with the precalculations, comes to 24 cycles. Furthermore, eliminating the $2^0$ term, which raises the error on $C_5$ to about 3%, reduces the total number of operations to 20. It should be noted that the calculation of the odd-numbered coefficients of the fast DCT discussed above uses 11 additions and 4 multiples beyond the initial calculation of sums and differences, where multiplies take more than one cycle—often between 4 and 11 cycles—on many microprocessors.

According to the second criterion, C2, all scaled integer basis multipliers, e.g., in the case of the FDCT, $C_1$ through $C_7$, appearing in the same sum (e.g., in the same set 1, 2, or 3 above) should possess simultaneous binary representations with the non-zero power-of-2 terms as clustered as possible; i.e., the difference between the largest power of 2 and the smallest is as small as possible. An example of a clustered representation is demonstrated by the following: $28 = 2^5 - 2^2$ and $28 = 2^4 + 2^3 + 2^2$. In the first representation, the powers of two are spread by $5-2=3$, and in the second, they are spread by $4-2=2$. This would make the second representation for 28 more "clustered" than the first. The advantage is this: suppose that all of the constants in a set have representations where the smallest power of 2 is $2^2$. This means that there are 2 bits of precision in the calculation that can be picked up in quantization and scaling—effectively, we are dividing all of the constants by $2^2$ so that we do not have to perform the shifts for the trailing zeros.

The additional magnitude represented by these trailing zeros may be reintroduced into the numbers if needed before quantization, for example, if a trailing 1 in one of the representations needs to be "picked up" for precision to make the quantization decision. (See the example under C1 above where we suggest the possible dropping of the $2^0$ term.)

Figure 3:
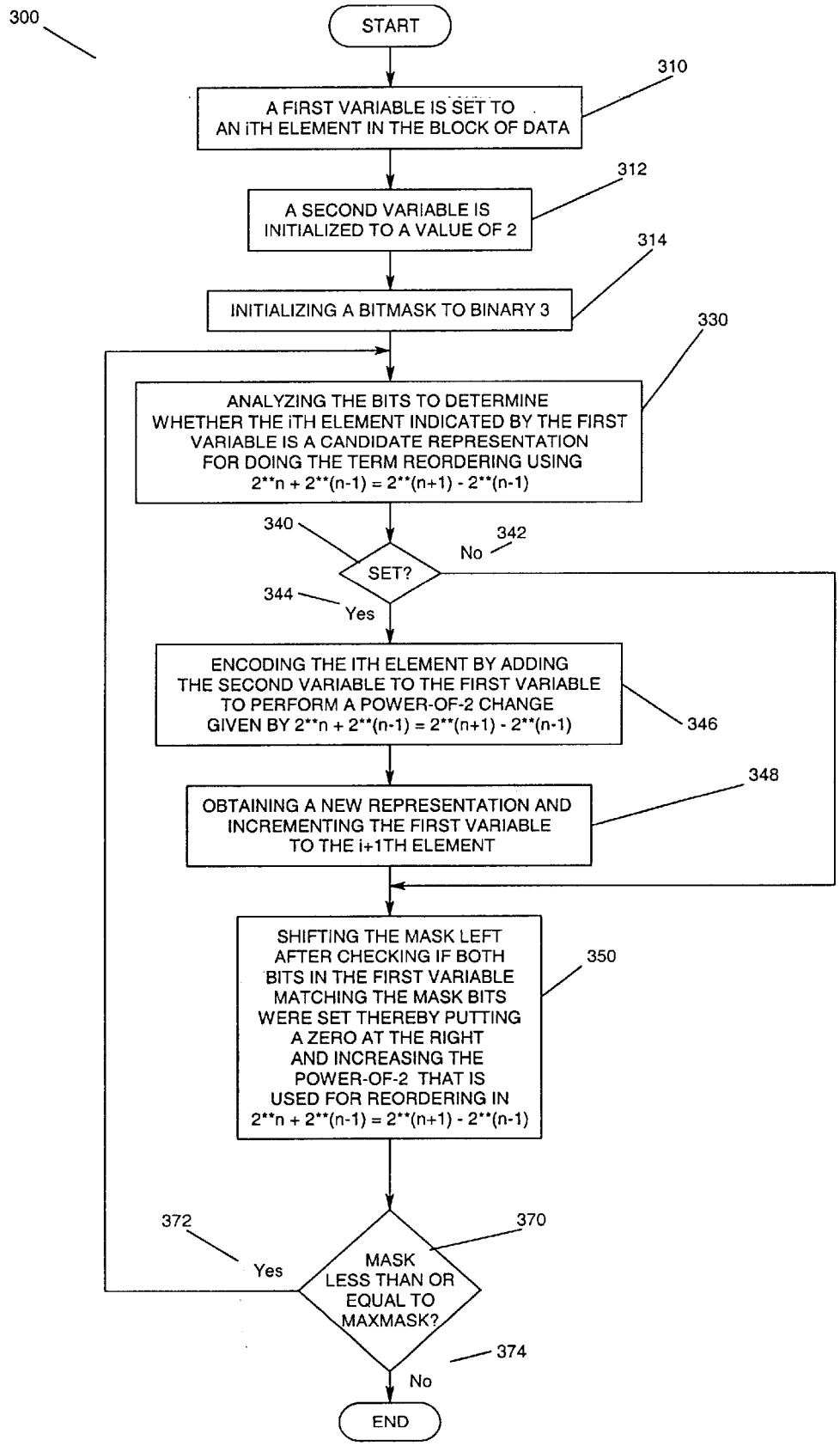
FIG. 3 illustrates a flow chart of a method for finding the simultaneous representations for the first criteria, C1, or second criteria, C2.

FIG. 3 illustrates a flow chart 300 of a method for finding the simultaneous representations for the second criteria, C2, using the condition:

$$2^n + 2^{n-1} = 2^{n+1} - 2^{n-1} \quad (5)$$

First, "num" is set to the repcount-$1^{th}$ element of the array "reps" 310. The current count of representations for a given number is the "repcount." The variable "add" is initialized to 2 312. The bitmask is initialized to binary 0 . . . 011 314.

The bits are checked to determine if both bits in num matching the mask bits were set 340. If not 342, the mask is shifted left by one 350, effectively putting a zero at the right and the add is shifted left by one thereby increasing the power of 2 that is used for reordering in equation (5) above. If both bits in num matching the mask bits were set 344, then this bit pattern "num" is a candidate representation for doing the term reordering using the condition (5) above. Then, "num" encodes the representation by adding "add" to "num" to perform the power-of-2 change that is given by the equation shown in condition (5) above 346. This provides for more speed and storage efficiency than a brute force method; e.g., performing exhaustive search for representations, and storing all of the zero, +1, and −1 values separately. A new representation is obtained and repcount is set to repcount +1 348. The mask is shifted left by one 350.

The shifting is performed until a predetermined maximum, "maxmask" is reached 370. If the predetermined maximum has not been reached, the routine is repeated with the new repcount so that "num" is set to the new representation 372. Otherwise 374, the routine ends.

By the way in which the representations are coded in the program, the program only keeps track of whether the coefficient in the power-of-2 polynomial (see, for example, equation (4)) is non-zero; i.e., ±1 are both stored as a "1" bit, and 0 is stored as a "0" bit. The power-of-2 term in the polynomial is encoded in the bit position; e.g., bit zero (right most) corresponds to $2^0$. The program does not differentiate between ±1, so one might wonder how the program keeps track of representations. Since the mask scans left in the integer representation, and since the change of representation from $2^n + 2^{n-1}$ to $2^{n+1} - 2^{n-1}$ effectively moves powers of 2 left only in the polynomial representation (i.e., it only increases the power of 2 used in the representation), there is no chance of moving a power of 2 so that a power of 2 with a +1 multiplier adds with the same power of 2 with a −1 multiplier. Thus, it suffices only to keep track of whether the multipliers are non-zero, since the knowledge of the original integer, coupled with the stored integer in "reps" above, are enough to uniquely determine the representation.

As mentioned above, the present invention also works for sub-transforms that don't split the terms nicely into disjoint sets of equations, as the FDCT (and IDCT) could be split into sets 1, 2, and 3 above. As mentioned above, the term "disjoint", when used herein in reference to the sets of equations, means that there are no transform constants in common between equations in the two disjoint sets of equations. If these power-of-2 simultaneous representations for the constants are used, a speedup may still be achieved by choosing sets of equations in the transform, either arbitrarily or according to some cost function, and by selecting an independent scaling term for the constants in each set, grouping by powers-of-two for the transform constant representations. So one would still want to do the criteria for finding representations for the coefficients in the arbitrary equation sets. It just works out particularly nicely when the transform breaks into disjoint equation sets since the transform constants are grouped in the sets.

Below is an example with the FDCT where we use a different grouping:

$$2S(0)=C_4(s_{0734}+s_{1625})$$

$$2S(3)=C_3d_{07}-C_7d_{16}-C_1d_{25}-C_5d_{34}$$

$$2S(5)=C_5d_{07}-C_1d_{16}+C_7d_{25}+C_3d_{34} \quad (6)$$

$$2S(2)=C_2d_{0734}+C_6d_{1625}$$

$$2S(6)=C_6d_{0734}-C_2d_{1625}$$

$$2S(4)=C_4(s_{0734}-s_{1625}) \quad (7)$$

$$2S(1)=C_1d_{07}+C_3d_{16}+C_5d_{25}+C_7d_{34}$$

$$2S(7)=C_7d_{07}-C_5d_{16}+C_3d_{25}-C_1d_{34} \quad (8)$$

Now one scaling term for set 6 can be obtained, and simultaneous representations for $C_1$, $C_3$, $C_4$, $C_5$, $C_7$ can be found for performing the three calculations in that set. Then a different scaling term for set 8 and simultaneous representations for $C_1$, $C_3$, $C_5$, $C_7$ for those equations may be found, where these representations may be very different from those representations used in the calculations for set 6.

Figure 4:
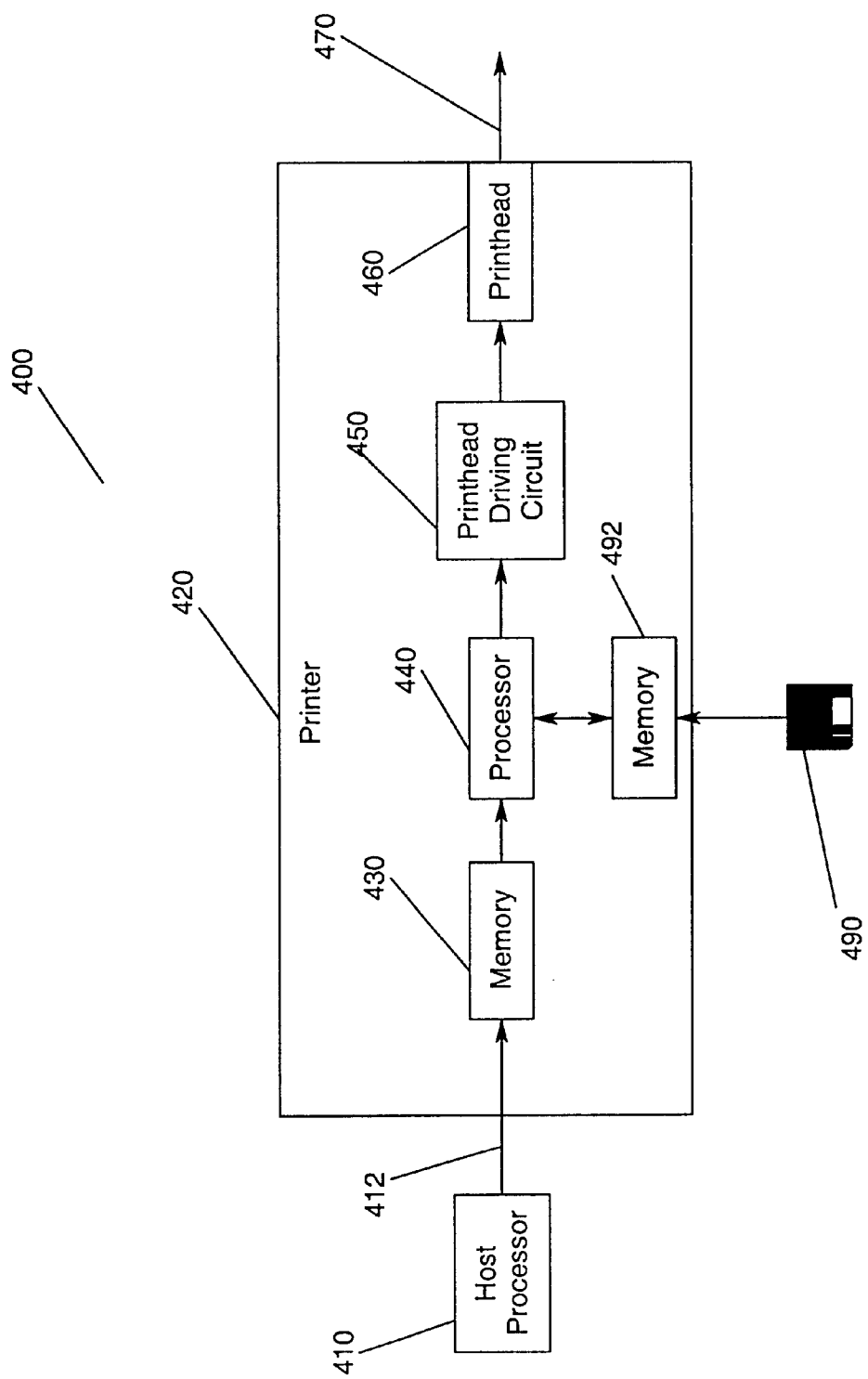
FIG. 4 illustrates a printer according to the present invention.

FIG. 4 illustrates a block diagram 400 of a printer 410 according to the present invention. In FIG. 4, the printer 410 receives image data 412 from a host processor 410. The image data 412 is provided into memory 430 where the image data may be arranged into 8×8 block samples. The 8×8 block samples are then processed by a processor 440, such as a raster image processor. The raster image processor 440 provides a compressed print stream representing the image data to a printhead driving circuit 450. The printhead driving circuit 450 then controls the printhead 460 to generate a printout 470 of the image data.

The process illustrated with reference to FIGS. 1–3 may be tangibly embodied in a computer-readable medium or carrier 490, e.g. one or more of the fixed and/or removable data storage devices illustrated in FIG. 4, or other data storage or data communications devices. The computer program may be loaded into the memory 492 to configure the processor 440 of FIG. 4, for execution. The computer program comprises instructions which, when read and executed by the processor 440 of FIG. 4, causes the processor 440 to perform the steps necessary to execute the steps or elements of the present invention.

Figure 5:
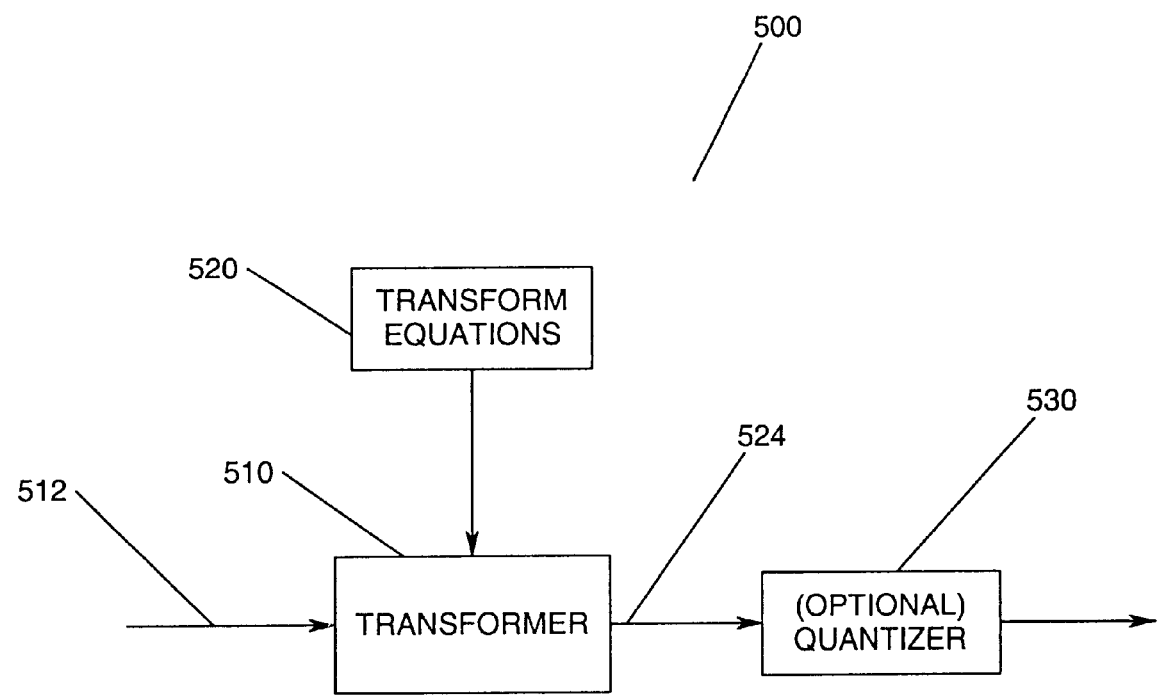
FIG. 5 illustrates a data analyzing system according to the present invention.

FIG. 5 illustrates a data analyzing system 500 according to the present invention. In FIG. 5, a transform 510 receives a block of data 512 to be analyzed. The transform 510 uses transform equations 520 to generate transformed data 524. Transform equations 520 are split into at least one sub-transform having at least two transform constants. The at least two transform constants for each collection are independently scaled with a scaling term to maintain a substantially uniform ratio between the at least two transform constants within the at least one collection, wherein the scaling term may be chosen according to a predetermined cost function. The transformed data 524 may then be optionally quantized by quantizer 530. The quantization values in quantizer 530 are adjusted to reflect the scaling terms used for each coefficient.

Figure 6:
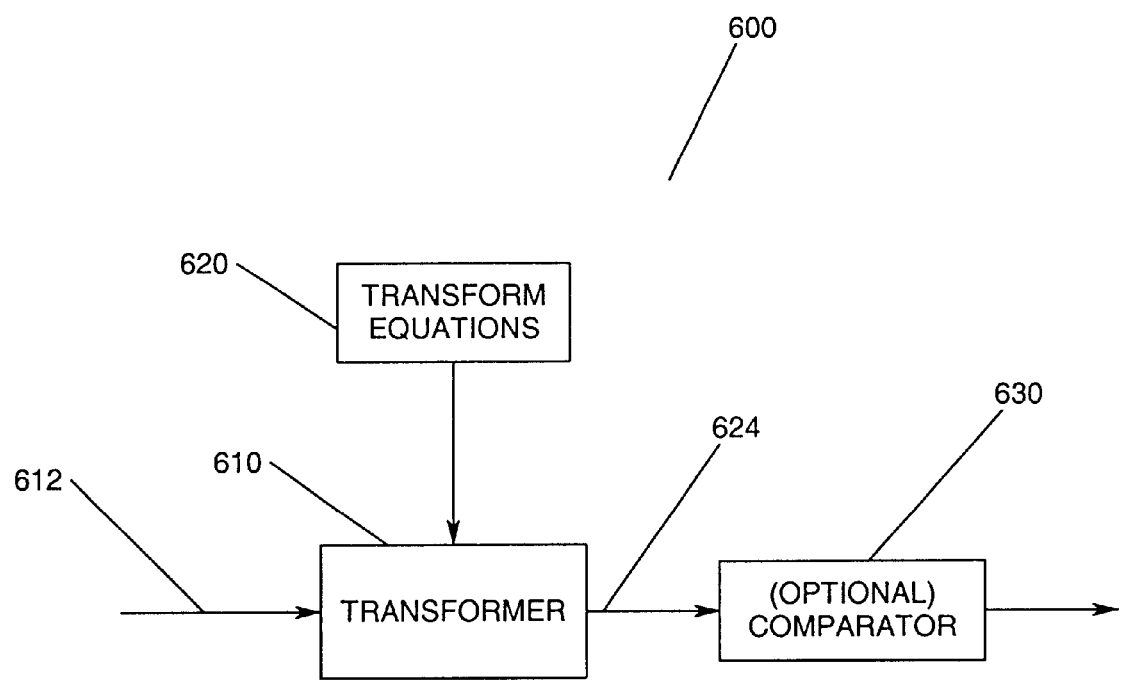
FIG. 6 illustrates another data analyzing system according to the present invention.

FIG. 6 illustrates another data analyzing system 600 according to the present invention. In FIG. 6, a transform 610 receives a block of data 612 to be analyzed. The transform 610 uses transform equations 620 to generate transformed data 624. Transform equations 620 are split into at least one sub-transform having at least two transform constants. The at least two transform constants for each collection are independently scaled with a scaling term to maintain a substantially uniform ratio between the at least two transform constants within the at least one collection, wherein the scaling term may be chosen according to a predetermined cost function. The transformed data 624 may then be compared to scaled comparison values in comparator 630.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for processing data, comprising:
   arranging transform equations into a plurality of collections, each of the plurality of collections having at least two transform equations, each collection having at least two transform constants; and
   independently scaling each collection with a scaling term to maintain a substantially uniform ratio between the transform constants within each scaled collection;
   wherein the scaling term for each collection is chosen by selecting the scaling term and representations for the transform constants so that all transform constants for a collection possess simultaneous binary representations with a minimum number of common power-of-2 terms.

2. The method of claim 1 further comprising separating data into at least one block and transforming the block into transform data via the scaled transform equations.

3. The method of claim 1 wherein the scaling term is selected so that the largest error on any transform coefficient is no larger than a predetermined error percentage.

4. The method of claim 1 wherein the scaling term is selected so that the largest error on each involved transform coefficient is no larger than its individual predetermined error percentage.

5. The method of claim 1 wherein the scaling term is selected so that predetermined transform constants have an error less than or equal to a predetermined error percentage.

6. The method of claim 1 wherein the scaling term is selected so that each involved predetermined transform constant has an error less than or equal to its individual predetermined error percentage.

7. The method of claim 1 wherein the selecting of the scaling term and representations for the transform constants so that all transform constants for a collection possess simultaneous binary representations with a minimum number of common power-of-2 terms is implemented when binary arithmetic shifts may be more efficient than multiplication operations.

8. The method of claim 7 wherein all representations of the scaled constants are found by:
   a) setting a first variable to an ith element in the block;
   b) initializing a second variable to a value of 2;
   c) initializing a bitmask to binary 3;
   d) analyzing the bits to determine whether the ith element indicated by the first variable is a candidate representation for doing the term reordering using $2^n+2^{n-1}=2^{n+1}-2^{n-1}$;
   e) encoding the ith element by adding the second variable to the first variable to perform an effective power-of-2 change given by $2^n+2^{n-1}=2^{n+1}-2^{n-1}$;
   f) obtaining a new representation and incrementing the first variable to the i+1th element;
   g) shifting the mask and second variable left one bit; and
   h) repeating d–g.

9. The method of claim 8 further comprising:
shifting the mask left after checking if the first variable matching the mask bits were set thereby putting a zero at the right and increasing the power of 2 that is used for reordering in $2^n+2^{n-1}=2^{n+1}-2^{n-1}$.

10. The method of claim 1 wherein the scaling term is selected to provide a maximized clustering of non-zero power-of-2 terms.

11. The method of claim 10 wherein the selecting of the scaling term so that all transform constants for a collection possess simultaneous binary representations with a maximized clustering of non-zero power-of-2 terms is implemented when multiplication operations employing smaller integers are more desirable than multiplies employing larger numbers.

12. The method of claim 11 wherein whether the coefficient in a power-of-2 polynomial representing the constant is non-zero is tracked.

13. The method of claim 12 wherein a value of the bit position determines the power-of-2 term.

14. The method of claim 11 wherein maximizing the clustering of non-zero power-of-2 terms comprises finding all representations of the scaled constants by:
   a) setting a first variable to an ith element in the block;
   b) initializing a second variable to a value of 2;
   c) initializing a bitmask to binary 3;
   d) analyzing the bits to determine whether the ith element indicated by the first variable is a candidate representation for doing the term reordering using $2^n+2^{n-1}=2^{n+1}-2^{n-1}$;
   e) encoding the ith element by adding the second variable to the first variable to perform an effective power-of-2 change given by $2^n+2^{n-1}=2^{n+1}-2^{n-1}$;
   f) obtaining a new representation and incrementing the first variable to the i+1th element;
   g) shifting the mask and second variable left one bit; and
   h) repeating d–g.

15. The method of claim 14 further comprising:
shifting the mask left after checking if the first variable matching the mask bits were set thereby putting a zero at the right and increasing the power of 2 that is used for reordering in $2^n+2^{n-1}=2^{n+1}-2^{n-1}$.

16. The method of claim 1 wherein the collections represent disjoint sets of transform equations of partial calculations.

17. The method of claim 1 wherein the collections do not represent disjoint sets of transform equations of partial calculations.

18. The method of claim 17 further comprising selecting an independent scaling term for the transform constants in each of the at least one collection.

19. A data compression system, comprising:
   a transformer for applying a linear transform to decorrelate data into transform coefficients using transform equations, the transform equations being formed by arranging transform equations into a plurality of collections, each of the plurality of collections having at least two transform equations, each collection having at least two transform constants and independently scaling each collection with a scaling term to maintain a substantially uniform ratio between the transform constants within each scaled collection; and
   a quantizer for quantizing the transformed data into quantized data by reducing a number of bits needed to represent the transform coefficients;
   wherein the scaling term for each collection is chosen by selecting the scaling term and representations for the transform constants so that all transform constants for a collection possess simultaneous binary representations with a minimum number of common power-of-2 terms.

20. The data compression system of claim 19 wherein the transformer separates data into at least one block and transforms the block into transform data via the scaled transform equations.

21. The data compression system of claim 19 further comprising an entropy encoder for further compressing the quantized data losslessly.

22. The data compression system of claim 19 wherein the scaling term is selected so that the largest error on any transform coefficient is no larger than a predetermined error percentage.

23. The data compression system of claim 19 wherein the scaling term is selected that the largest error on any transform coefficient is no larger than its individual predetermined error percentage.

24. The data compression system of claim 19 wherein the scaling term is selected so that predetermined transform constants have an error less than or equal to a predetermined error percentage.

25. The data compression system of claim 19 wherein the scaling term is selected so that each involved predetermined transform constant has an error less than or equal to its individual predetermined error percentage.

26. The data compression system of claim 19 wherein the selecting of the scaling term so that all transform constants for a collection possess simultaneous binary representations with a minimum number of common power-of-2 terms is implemented when binary arithmetic shifts may be more efficient than multiplication operations.

27. The data compression system of claim 26 wherein the transformer finds all representations of the scaled constants by:
   a) setting a first variable to an ith element in the block;
   b) initializing a second variable to a value of 2;
   c) initializing a bitmask to binary 3;

d) analyzing the bits to determine whether the ith element indicated by the first variable is a candidate representation for doing the term reordering using $2^n+2^{n-1}=2^{n+1}-2^{n-1}$;

e) encoding the ith element by adding the second variable to the first variable to perform an effective power-of-2 change given by $2^n+2^{n-1}=2^{2n+1}-2^{n-1}$;

f) obtaining a new representation and incrementing the first variable to the i+1th element;

g) shifting the mask and second variable left one bit; and h) repeating d–g.

28. The data compression system of claim 27 further comprising:

shifting the mask left after checking if the first variable matching the mask bits were set thereby putting a zero at the right and increasing the power of 2 that is used for reordering in $2^n+2^{n-1}=2^{n+1}-2^{n-1}$.

29. The data compression system of claim 19 wherein the scaling term is selected to provide a maximized clustering of non-zero power-of-2 terms.

30. The data compression system of claim 29 wherein the selecting of the scaling term so that all transform constants for a collection possess simultaneous binary representations with a maximized clustering of non-zero power-of-2 terms is implemented where multiplication operations employing smaller integers are more desirable than multiplies employing larger numbers.

31. The data compression system of claim 30 wherein whether the coefficient in a power-of-2 polynomial representing the constant is non-zero is tracked.

32. The data compression system of claim 31 wherein a value of the bit position determines the power-of-2 term.

33. The data compression system of claim 30 wherein the transformer maximizes the clustering of non-zero power-of-2 terms by:

a) setting a first variable to an ith element in the block;

b) initializing a second variable to a value of 2;

c) initializing a bitmask to binary 3;

d) analyzing the bits to determine whether the ith element indicated by the first variable is a candidate representation for doing the term reordering using $2^n+2^{n-1}=2^{n+1}-2^{n-1}$;

e) encoding the ith element by adding the second variable to the first variable to perform an effective power-of-2 change given by $2^n+2^{n-1}=2^{n+1}-2^{n-1}$;

f) obtaining a new representation and incrementing the first variable to the i+1th element;

g) shifting the mask and second variable left one bit; and h) repeating d–g.

34. The data compression system of claim 33 further comprising:

shifting the mask left after checking if the first variable matching the mask bits were set thereby putting a zero at the right and increasing the power of 2 that is used for reordering in $2^n+2^{n-1}=2^{n+1}-2^{n-1}$.

35. The data compression system of claim 19 wherein the collections do not represent disjoint sets of transform equations.

36. The data compression system of claim 19 wherein the collections do not represent disjoint sets of transform equations.

37. The data compression system of claim 36 further comprising selecting an independent scaling term for the transform coefficients in each collection.

38. A printer, comprising:

memory for storing image data;

a processor for processing the image data to provide a compressed print stream output; and a printhead driving circuit for controlling a printhead to generate a printout of the image data;

wherein the processor applies a linear transform to decorrelate data into transform coefficients using transform equations, the transform equations being formed by arranging transform equations into a plurality of collections, each of the plurality of collections having at least two transform equations, each collection having at least two transform constants and independently scaling each collection with a scaling term to maintain a substantially uniform ratio between the transform constants within each scaled collection, wherein the scaling term for each collection is chosen by selecting the scaling term and representations for the transform constants so that all transform constants for a collection possess simultaneous binary representations with a minimum number of common power-of-2 terms.

39. The printer of claim 38 wherein the processor separates data into at least one block and transforms the block into transform data via the scaled transform equations.

40. The printer of claim 38 wherein the scaling term is selected so that the largest error on any transform coefficient is no larger than a predetermined error percentage.

41. The printer of claim 38 wherein the scaling term is selected so that the largest error on each involved transform coefficient is no larger than its individual predetermined error percentage.

42. The printer of claim 38 wherein the scaling term is selected so that predetermined transform constants have an error less than or equal to a predetermined error percentage.

43. The printer of claim 38 wherein the scaling term is selected so that each involved predetermined transform constant has an error less than or equal to its individual predetermined error percentage.

44. The printer of claim 38 wherein the selecting of the scaling term so that all transform constants for a collection possess simultaneous binary representations with a minimum number of common power-of-2 terms is implemented when binary arithmetic shifts may be more efficient than multiplication operations.

45. The printer of claim 44 wherein the processor finds all representations of the scaled constants by:

a) setting a first variable to an ith element in the block;

b) initializing a second variable to a value of 2;

c) initializing a bitmask to binary 3;

d) analyzing the bits to determine whether the ith element indicated by the first variable is a candidate representation for doing the term reordering using $2^n+2^{n-1}$ $2^{n+1}-2^{n-1}$;

e) encoding the ith element by adding the second variable to the first variable to perform an effective power-of-2 change given by $2^n+2^{n-1}=2^{n+1}-2^{n-1}$;

f) obtaining a new representation and incrementing the first variable to the i+lth element;

g) shifting the mask and second variable left one bit; and h) repeating d–g.

46. The printer of claim 45 further comprising:

shifting the mask left after checking if the first variable matching the mask bits were set thereby putting a zero at the right and increasing the power of 2 that is used for reordering in $2^n+2^{n-1}=2^{n+1}-2^{n-1}$.

47. The printer of claim 38 wherein the scaling term is selected to provide a maximized clustering of non-zero power-of-2 terms.

48. The printer of claim 47 wherein the selecting of the scaling term so that all transform constants for a collection possess simultaneous binary representations with a maximized clustering of non-zero power-of-2 terms is implemented where multiplication operations employing smaller integers are more desirable than multiplies employing larger numbers.

49. The printer of claim 48 wherein whether the coefficient in a power-of-2 polynomial representing the constant is non-zero is tracked.

50. The printer of claim 49 wherein a value of the bit position determines the power-of-2 term.

51. The printer of claim 48 wherein the processor maximizes the clustering of non-zero power-of-2 terms by:
   a) setting a first variable to an ith element in the block;
   b) initializing a second variable to a value of 2;
   c) initializing a bitmask to binary 3;
   d) analyzing the bits to determine whether the ith element indicated by the first variable is a candidate representation for doing the term reordering using $2^n+2^{n+1}=2^{n+1}-2^{n-1}$;
   e) encoding the ith element by adding the second variable to the first variable to perform an effective power-of-2 change given by $2^n+2^{n+1}=2^{n+1}-2^{n-1}$;
   f) obtaining a new representation and incrementing the first variable to the i+1th element;
   g) shifting the mask and second variable left one bit; and
   h) repeating d–g.

52. The printer of claim 51 further comprising;
   shifting the mask left after checking if the first variable matching the mask bits were set thereby putting a zero at the right and increasing the power of 2 that is used for reordering in $2^n+2^{n+1}=2^{n+1}-2^{n-1}$.

53. The printer of claim 38 wherein the collections represent disjoint sets of transform equations.

54. The printer of claim 38 wherein the collections do not represent disjoint sets of transform equations.

55. The printer of claim 54 further comprising selecting an independent scaling term for the transform coefficients in each collection.

56. An article of manufacture comprising a program storage medium readable by a computer, the medium tangibly embodying one or more programs of instructions executable by the computer to perform a method for performing fast data transformation using scaled terms, the method comprising:
   arranging transform equations into a plurality of collections, each of the plurality of collections having at least two transform equations, each collection having at least two transform constants; and
   independently scaling each collection with a scaling term to maintain a substantially uniform ratio between the transform constants within each scaled collections;
   wherein the scaling term for each collection is chosen by selecting the scaling term and representations for the transform constants so that all transform constants for a collection possess simultaneous binary representations with a minimum number of common power-of-2 terms.

57. The article of manufacture of claim 56 further comprising separating data into at least one block and transforming the block into transform data via the transform equations.

58. The article of manufacture of claim 56 wherein the scaling term is selected so that the largest error on any transform coefficient is no larger than a predetermined error percentage.

59. The article of manufacture of claim 56 wherein scaling term is selected so that the largest error on each involved transform coefficient is no larger than its individual predetermined error percentage.

60. The article of manufacture of claim 56 wherein the scaling term is selected so that predetermined transform constants have an error less than or equal to a predetermined error percentage.

61. The article of manufacture of claim 56 wherein the scaling term is selected so that each involved predetermined transform constant has an error less than or equal to its individual predetermined error percentage.

62. The article of manufacture of claim 56 wherein the selecting of the scaling term so that all transform constants for a collection possess simultaneous binary representations with a minimum number of common power-of-2 terms is implemented when binary arithmetic shifts may be more efficient than multiplication operations.

63. The article of manufacture of claim 56 wherein the scaling term is selected to provide a maximized clustering of non-zero power-of-2 terms.

64. The article of manufacture of claim 63 wherein the selecting of the scaling term so that all transform constants for a collection possess simultaneous binary representations with a maximized clustering of non-zero power-of-2 terms is implemented where multiplication operations employing smaller integers are more desirable than multiplies employing larger numbers.

65. A data analysis system, comprising;
   transform equations being formed by arranging transform equations into a plurality of collections, each of the plurality of collections having at least two transform equations, each collection having at least two transform constants and independently scaling each collection with a scaling term to maintain a substantially uniform ratio between the transform constants within each scaled collection, wherein the scaling term is chosen according to a predetermined cost function; and
   a transformer for applying the transform equations to perform a linear transform to decorrelate data into transform coefficients;
   wherein the scaling term for each collection is chosen by selecting the scaling term and representations for the transform constants so that all transform constants for a collection possess simultaneous binary representations with a minimum number of common power-of-2 terms.

66. The data analysis system of claim 65 wherein the transformer separates data into at least one block and transforms the block into transform data via the transform equations.

* * * * *

UNITED STATES PATENT AND TRADEMARK OFFICE
CERTIFICATE OF CORRECTION

PATENT NO. : 6,766,341 B1
DATED : July 20, 2004
INVENTOR(S) : Trelewicz et al.

It is certified that error appears in the above-identified patent and that said Letters Patent is hereby corrected as shown below:

Column 12,
Line 43, "transform constants; and" should read -- transform constants; --.
Line 46, "scaled collection;" should read -- scaled collection; and --.

Column 14,
Line 22, "scaled collection; and" should read -- scaled collection; --.
Line 25, "transform coefficients;" should read -- transform coefficients; and --.

Column 15,
Line 7, "$=2^{2n+1} - 2^{n-1};$" should read -- $2^{n+1} - 2^{n-1}$ --.

Column 16,
Line 52, "$2^n+2^{n-1}$" should read -- $2^n+2^{n-1}=$ --.

Column 17,
Line 24, "$2^n+2^{n+1}=2^{n+}$" should read -- $2^n+2^{n-1}=2^{n+}$ --.
Lines 28 and 37, "$2^n+2^{n+1}=2^{n+1} - 2^{n-1}$" should read -- $2^n + 2^{n-1} = 2^{n+1} - 2^{n-1}$ --.
Line 54, "transform constants; and" should read -- transform constants; --.
Line 57, "scaled collections;" should read -- scaled collections; and --.

Column 18,
Line 48, "cost function; and" should read -- cost function; --.
Line 51, "transform coefficients;" should read -- transform coefficients; and --.

Signed and Sealed this

Twenty-eighth Day of December, 2004

JON W. DUDAS
*Director of the United States Patent and Trademark Office*